Figure 1:
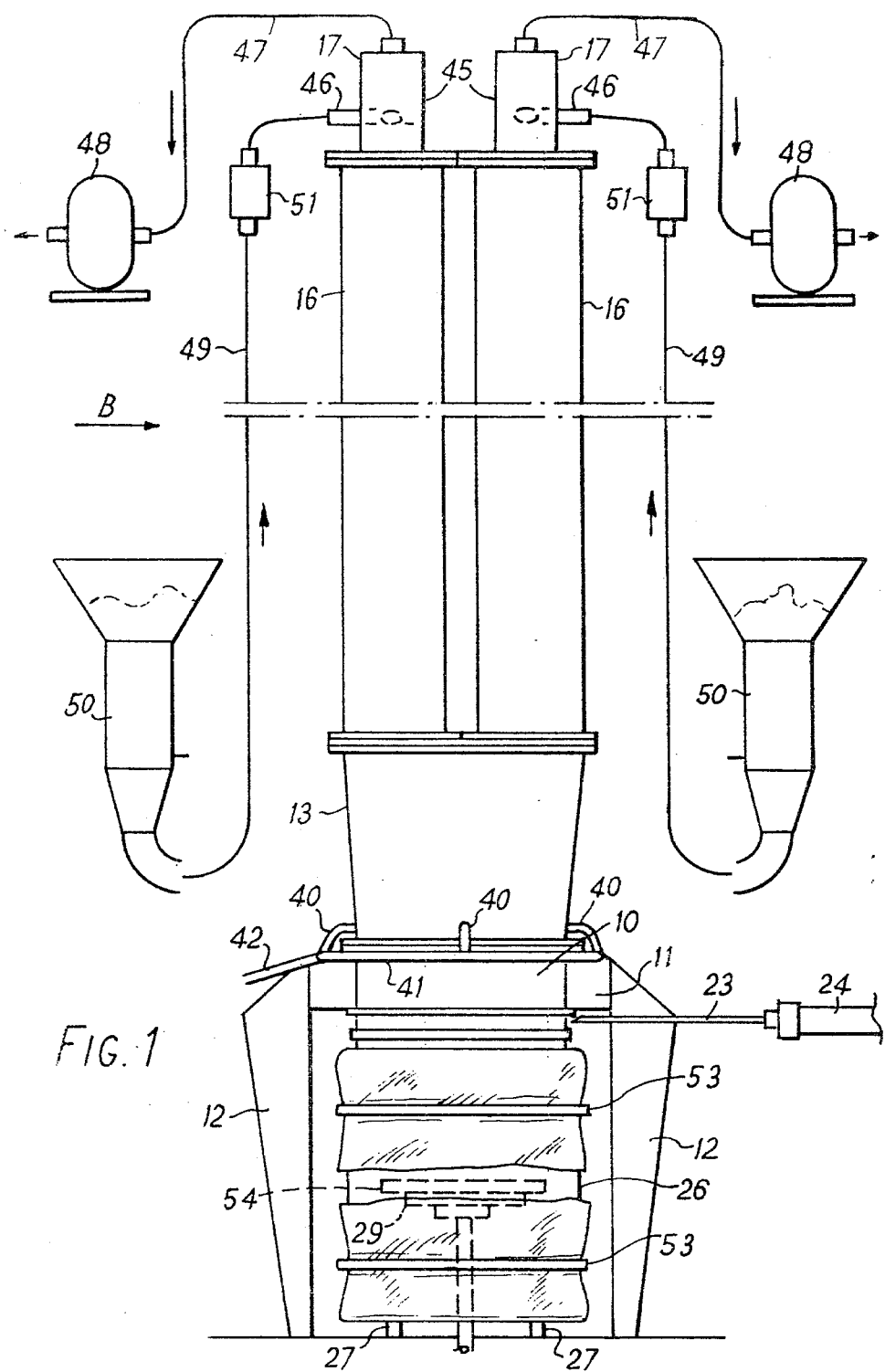

United States Patent [19]

Brockwell et al.

[11] 4,334,465
[45] Jun. 15, 1982

[54] METHOD AND APPARATUS FOR PROCESSING AND PACKAGING CHEESE

[75] Inventors: Ian P. Brockwell, Wyckoff, N.J.; Karl J. G. Martensson, Lund, Sweden

[73] Assignee: Alfa-Laval Cheddar Systems Limited, Yeovil, England

[21] Appl. No.: 166,833

[22] Filed: Jul. 8, 1980

[30] Foreign Application Priority Data

Jul. 26, 1979 [AU] Australia ............................... PD9739

[51] Int. Cl.³ ........................ A01J 25/11; A23C 19/02
[52] U.S. Cl. ........................................ 99/454; 99/458; 425/80.1
[58] Field of Search ................. 99/458, 452, 454, 465, 99/472; 425/80; 141/69, 129, 168, 172, 198, 275-278, 327

[56] References Cited

U.S. PATENT DOCUMENTS

| | | | |
|---|---|---|---|
| 3,221,407 | 12/1965 | Jagoueix | 99/458 |
| 3,794,087 | 2/1974 | Spano et al. | 141/172 |
| 4,061,794 | 12/1977 | Charles | 99/458 X |

*Primary Examiner*—Frederick R. Schmidt
*Attorney, Agent, or Firm*—Curtis, Morris & Safford

[57] ABSTRACT

A method and apparatus for processing and packaging cheese in which cheese curd which has been milled and salted is fed into four columns mounted on an upright tubular trunk fitted at the lower end with a guillotine blade movable between a closed position in which it closes the bottom of the trunk and an open position in which the blade is wholly clear of the trunk. The columns are maintained at a sub-atmospheric pressure so that air in the curd is flashed off immediately the curd enters the columns. The curd in the columns flows into the trunk and merges with the curd from the other columns to form a pillar of curd supported on the guillotine blade. The walls of the columns are perforated for drainage of whey pressed out from the curd by the weight of superimposed curd. An elevator below the trunk lowers the pillar of curd when the guillotine blade is withdrawn, the blade being subsequently returned to cut off a block of cheese from the lower end of the pillar. The elevator lowers the block of cheese into an open-ended rectangular container lined with a tube of plastics material which is subsequently sealed and evacuated to enclose the block of cheese.

7 Claims, 4 Drawing Figures

METHOD AND APPARATUS FOR PROCESSING AND PACKAGING CHEESE

The present invention relates to cheese production and is concerned more particularly with a method and apparatus for producing large blocks of cheese curd prepared for maturing.

Cheese curd is prepared for maturing by first passing the cheese curd through a mill where it is cut into pieces, cubes, chips or granules, and then mixing the curd with salt and any other desired additive. The term prepared curd is used herein to denote the mixture used for making cheese.

In one known system for producing large blocks of cheese from prepared cheese curd, open-ended wooden (plywood panel) crates are lined with plastics or cloth material and filled with the prepared cheese curd. The upper end of the crate is then closed by a panel and weights are applied to the panel to press the cheese. At the same time drainage means are used to remove any remaining whey in the curd which is expelled during pressing. After a fairly lengthy pressing time, the crate is inverted and the pressing procedure is repeated on the other side of the cheese block. After pressing, the height of the block within the crate is reduced relative to the crate itself. A panel is then placed on top of the curd (and liner) and pressure is maintained on the curd by a plurality of compression springs placed above the panel and compressed by a second end panel closing the crate, this second panel being clipped or strapped in position. The crate being strapped is then ready for storage and/or transport. The above mentioned system has many disadvantages. Firstly, the cheese produced tends to have a very open texture and poor surface finish, partially due to the difficulty in removing the whey effectively from a large cross section of curd (e.g. 22"×28"). Secondly, the production method is labour intensive and therefore expensive and, in addition, the wooden crates are relatively expensive to produce.

In another known apparatus, prepared cheese curd is filled under vacuum into a vertically extending chamber whereby the pillar of cheese curd itself, aided by the application of vacuum, begins to fuse together. The cheese curd conditioned in this way is removed from the base of the vertically extending chamber and severed to form a block which will mature into cheese. Whey expelled from the curd during the conditioning is drawn through perforated walls in the vertical chamber and removed through a whey drainage system. The aforementioned cheese production method and apparatus is known as the Wincanton system and is more fully described in U.S. Pat. No. 3,468,026. The advantage of this system is that it minimizes the labour content involved in the pressing and packaging areas of cheese production, and also produces a cheese which has been efficiently drained throughout and subsequently has a very good texture. The main disadvantage of the system is that the size of the block produced is limited by the fact that the cross-sectional width of the vertical chamber cannot be increased above a certain dimension. The maximum dimension is determined by the ability of whey in the central regions of the cheese pillar being able to drain to the whey removal means in the outer walls of the chamber.

The object of the invention is to provide an improved arrangement of the above mentioned Wincanton system which enables larger blocks of cheese to be produced, adequately drained of whey throughout the block, than has hitherto been possible with the arrangement described in the above mentioned U.S. Pat. No. 3,468,026.

According to the present invention there is provided a method of forming large blocks of cheese from prepared cheese curd for packaging and maturing, comprising feeding the curd into a plurality of hollow columns the lower ends of which are connected to the upper end of an upright hollow trunk having internal transverse dimensions substantially equal to that of the desired blocks of cheese, so as to fill the trunk with a mass of curd and at least partly fill the columns with curd supported on the mass of curd in the trunk, the walls of at least the lower ends of said columns having perforations for passage therethrough of whey pressed out from the curd by the weight of superimposed curd, extracting air and whey from the columns so as to maintain a sub-atmospheric pressure therein during feeding of the curd into the columns whereby air introduced into the columns with the curd is "flashed off" before the curd is deposited on the curd already in the columns, lowering the mass of curd in the trunk so that the curd in the lower end portions of the columns flows into the trunk and fuses with the curd therein to form a pillar of curd, severing the lower end of the pillar of curd to form a block of cheese, and continuing the feeding, lowering and severing operations.

In the method of the invention, the hollow columns are of a width which is small enough for the whey in the central region of each column to be able to drain through the perforations in the column to any desired extent before the curd merges with the curd from the other columns. The aggregate of the internal cross sectional areas of the columns is preferably substantially equal to the internal cross sectional area of the trunk so that the rate of descent of the curd in the columns is substantially the same as that of the curd in the trunk and there is little or no discontinuity in the flow of curd across the transition between the columns and the trunk.

The pillar of curd can conveniently be lowered partly into an open-ended container, prior to severing the lower end of the pillar to form the block of cheese, and the block of cheese subsequently lowered fully into the container. The cross sectional dimensions of the container can conveniently be only slightly larger than those of the block of cheese. Preferably, the container is lined internally with a tube of limp impermeably sheet material, the ends of which can be sealed after the block of cheese has been lowered fully into the tube in the container.

According to the present invention there is further provided apparatus for forming large blocks of cheese from prepared cheese curd for packaging and maturing, comprising an upright hollow trunk having internal transverse dimensions substantially equal to that of the desired blocks of cheese, a plurality of hollow columns having the lower ends thereof connected to the upper end of the trunk, means for feeding prepared cheese curd into said columns so as to fill the trunk with a mass of curd and at least partly fill the columns with curd supported on the mass of curd in the trunk, vacuum means for maintaining the interiors of the columns at a sub-atmospheric pressure during feeding of the curd therein whereby air introduced into the columns with the curd is immediately "flashed off", means for removing whey expressed from the curd in the lower end portions of the columns due to the weight of curd superimposed thereon, means for lowering the mass of curd in the trunk so that the curd in the lower end portions of the columns flows into the trunk and fuses with the curd therein to form a pillar of curd, and means for severing the lower end of said pillar of curd to form a block of cheese.

The severing means preferably comprises a guillotine blade adapted to close the lower end of the trunk, the blade being movable to an open position permitting downwards movement of the curd in the trunk. The lowering means may include a platform positioned directly below the trunk, and elevating means operable to raise the platform to a position immediately below the guillotine blade for support of the pillar of curd upon movement of the guillotine blade into the open position.

The apparatus preferably has four separate columns each having a substantially rectangular cross section, the four columns being arranged in a square formation, i.e. each column in plan view forming one quarter of a square. Each column can conveniently be formed by a perforated internal lining on a casing, the lining being spaced from the casing to form a passageway leading to a drainage piping system. The trunk may also be provided with a perforated lining spaced from the wall of the trunk to form a drainage passage.

Each column may be provided with a separate air evacuator system, and a rotary distributor may be provided for feeding prepared cheese curd from a single line into the upper regions of the columns. Alternatively, separate evacuation means and feed lines may be provided for each of the separate columns. Advantageously, the feed lines may include a cyclone separator to provide an initial means for separating air from the cheese curd.

Figure 2:
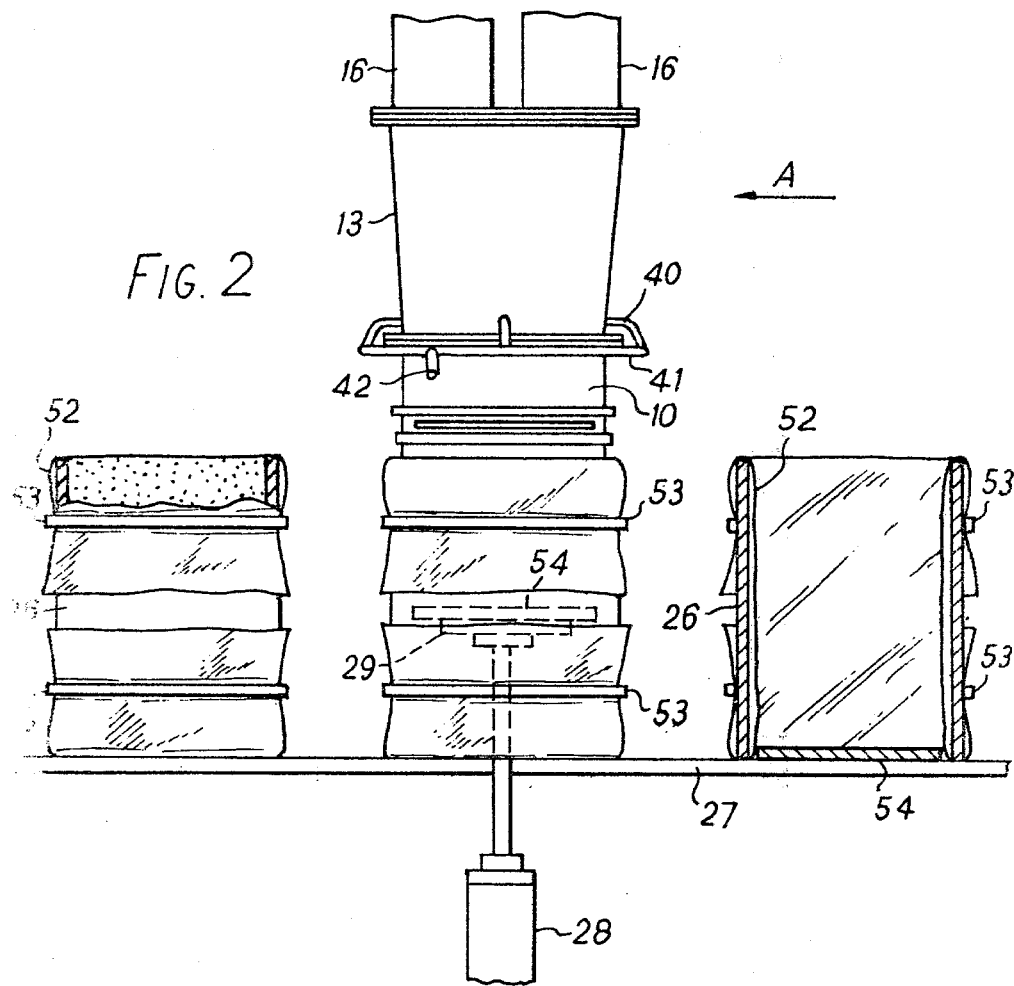
Figure 3:
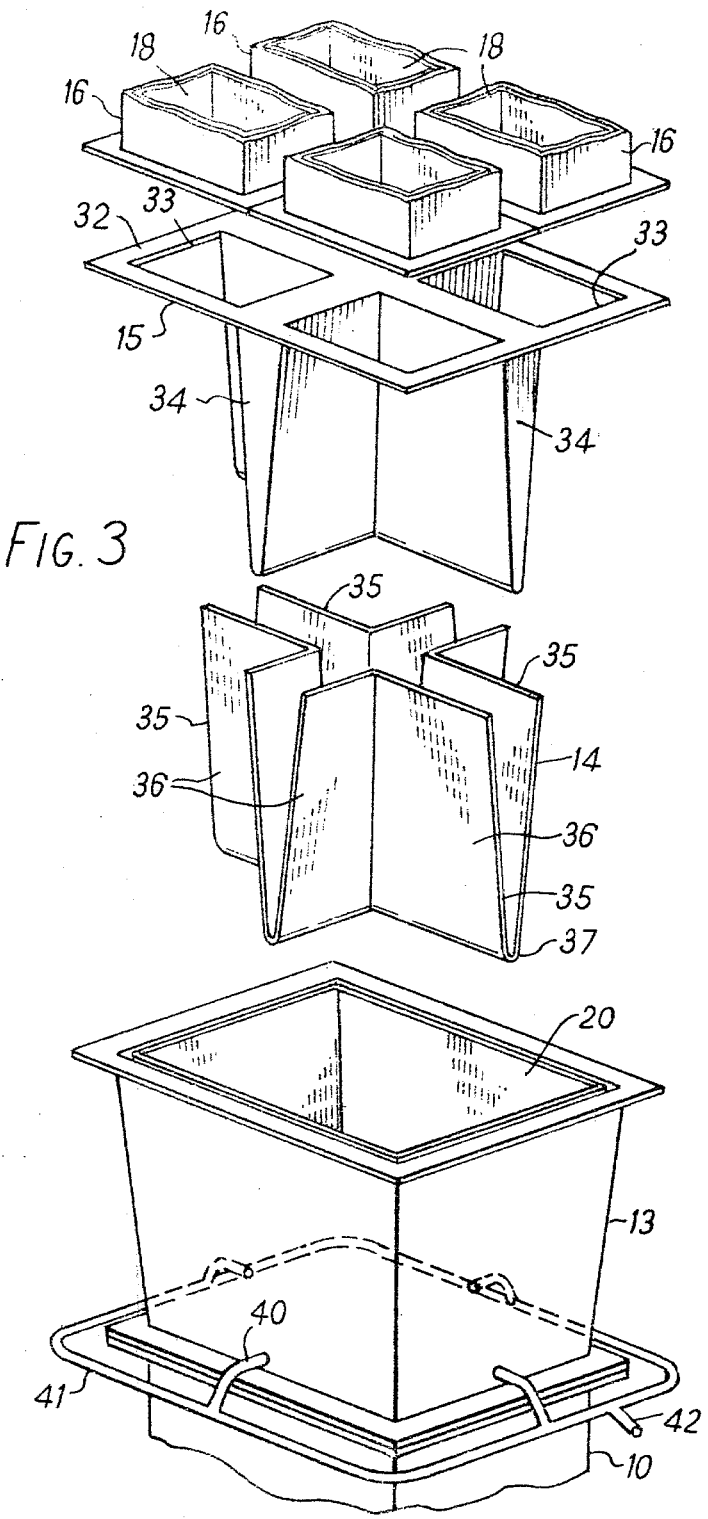
Figure 4:
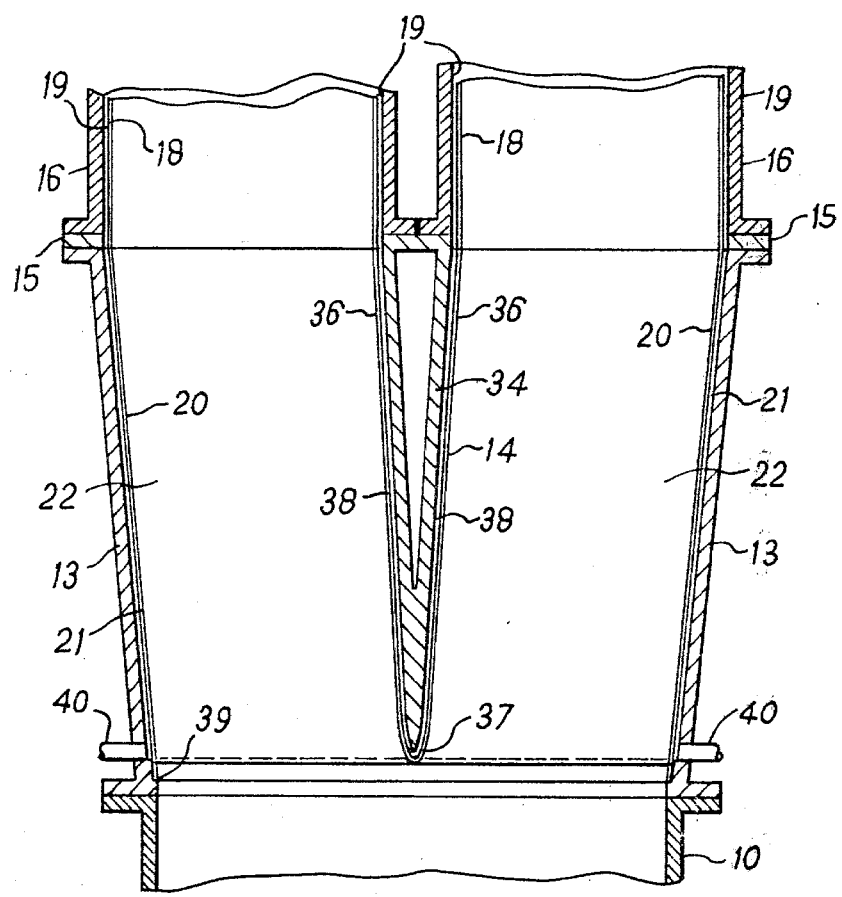

One construction of apparatus suitable for forming blocks of cheese in accordance with the invention and adapted to feed the blocks of cheese into containers, will now be described by way of example with reference to the accompanying diagrammatic drawings, in which:

FIG. 1 is an elevation view of the apparatus and a container being filled with a block of cheese, taken in the direction of arrow A in FIG. 2, the centre portion of the apparatus being shown cut away for convenience to reduce the overall height, FIG. 2 is an elevation view of the lower portion of the apparatus of FIG. 1 taken in the direction of arrow B in FIG. 1, showing a line of containers to be filled with blocks of cheese, FIG. 3 is an exploded view of components forming part of the lower portion of the apparatus, and FIG. 4 is a cross sectional elevation view of the components of FIG. 3 when assembled.

Referring first to FIG. 1, the apparatus comprises a tubular trunk 10 of rectangular section supported in an upright position on a frame 11 having legs 12 anchored to the ground, a tubular frusto-conical casing 13 of rectangular section mounted in an inverted position on trunk 10, a partition member 14 (FIG. 3) of cruciform shape mounted inside the casing 13, a support member 15 mounted on the upper end of the casing 13, four tall tubular casings 16 of rectangular section mounted in an upright position on the support member 15, the casings 16 being grouped close together in a square formation, and four cyclone separators 17 (FIG. 1) mounted one on the top of each casing 16. Each of the casings 16 is fitted internally with a thin-walled tubular column 18 of rectangular section spaced a short distance from the casing 16 to provide a drainage passageway 19 therebetween (FIG. 4), and the casing 13 is fitted with an inverted frusto-conical tube 20 of rectangular section spaced a short distance from the casing 13 to provide a drainage passageway 21 therebetween. The tube 20 co-operates with the partition member 14 to form four ducts 22 each extending between the lower end of a different one of the columns 18 and the upper end of the trunk 10. A guillotine blade 23 is mounted in guides (not shown) and is movable by a piston and cylinder motor 24 through a slot in the trunk between a closed position in which it closes the lower end of the trunk 10, and an open position in which it is withdrawn wholly clear of the lower end of the trunk. The containers 26 to be filled are movable along a track 27 extending across and below the trunk 10, and an upright piston and cylinder motor 28 is positioned directly below the trunk 10 and operable to raise and lower a platform 29 above and below the track for the containers.

As shown in FIG. 3, the support member 15 comprises a flat plate 32 formed with four apertures 33 arranged to register with the four casings 16 with the inside surfaces of each aperture lying flush with the inside surfaces of the associated casing 16. The support member 15 also comprises four wedge shaped webs 34 projecting downwardly one from each of the four parts of the plate 32 between adjacent apertures 33.

The partition member 14 is formed from sheet metal and conforms to the shape of the side and bottom surfaces of the webs 34, so as to comprise four sections 35 each defining two adjacent walls 36 of a different one of the above mentioned ducts 22, the opposing walls 36 of adjacent sections 35 converging towards one another in the downward direction and being interconnected at their lower edges to form a drainage trough 37. The walls 36 are perforated for passage of liquid from the ducts 22 into drainage passageways 38 (FIG. 4) formed by the space between the walls 36 and the webs 34.

The walls of the columns 18 are perforated for drainage of whey into the passageways 19. The walls of each column can conveniently be formed by perforated liners on the inside wall of the casing 16. The liners may consist of thin stainless steel sheets, each sheet having small elongated strips punched out of the plane of the sheet to form two narrow slots on each side of each strip with the ends of the strips merging smoothly into the body of the sheet, as described in U.S. Pat. No. 4,157,690. The sheets are arranged so that the strips are vertical and project from the outside surfaces of the sheets. The inside surfaces of the walls of the columns 20 are thus smooth and unobstructed by any inwardly extending projections, and the strips space the body of the sheet from the casing 16 to provide the drainage passageways 19.

The wall of the tube 20 is also perforated for drainage of whey into the passageway 21. The tube 20 can also conveniently be formed by perforated liners as described in U.S. Pat. No. 4,157,680 referred to above. The tube 20 is supported on a ledge 39 (FIG. 4) on the casing 13 adjacent its lower edge, the ledge closing off the bottom of the drainage passageway 21 between the tube 20 and casing 13. The casing 13 is provided with drainage tubes 40 which extend through the wall of the casing 13 immediately above the ledge 39 and are arranged to drain off liquid collecting at the bottom of the passageway 21. The tubes 40 lead to a drainage manifold 41 having an outlet 42 connected to a liquid extraction pump (not shown).

As shown in FIG. 4, the partition member 14 and the tube 20 are arranged so that the ducts 22 defined by these components are in register with the columns 18 so as to provide in effect a continuation of the columns 18, with the ducts 22 converging towards one another in the downward direction. The lower edges of the columns 18 abut against the upper edge of the tube 20 and the walls 36 of the partition member so as to provide a substantially smooth transition therebetween. Liquid in the drainage passageway 19 between the columns 18 and the casings 16 thus drains partly into the passageway 21 between the tube 21 and the casing 13, and partly into the passageways 38 between the walls of the partition member 14 and the webs 34. Liquid in passageways 38 collects in the troughs 37 and then drains through the perforations in tube 20 into the passageways 21. Liquid in passageways 21 is drawn through the tubes 40 into the manifold 41.

The cyclone separators 17 are for use in feeding curd into the columns 18 and comprise an upright cylindrical chamber 45 and a curd inlet pipe 46 which opens into the chamber tangentially through the wall thereof. The bottom of the chamber 45 opens into the top of the column 18. The top of the chamber 45 has an outlet 47 connected to a vacuum pump 48 for evacuating air from the cyclone separator and the column.

The curd inlet pipe 46 is connected by a flexible pipe 49 to the outlet of a hopper 50 for storing curd to be fed to the column, the pipe 49 containing a valve 51 for controlling feed of the curd.

The containers 26 are open at the top and bottom and have internal transverse cross sectional dimensions slightly greater than that of the trunk 10 of the apparatus. Each container is lined internally with a tube 52 of heat-sealable impervious sheet material, the upper end of the tube being turned down over the top of the container and the lower end of the tube being turned up under the bottom of the walls of the container. The ends of the tube are held in position by detachable straps 53. An end panel 54 is placed inside the lined container at the lower end thereof, the end panel being of a size such that it can be raised and lowered inside the lined container.

At the start of an operational cycle of the apparatus, the curd feed pipes 49 are closed by valves 51, the lower end of the trunk 10 is sealed by the guillotine blade 23 which is in the closed position, and air is evacuated from the columns 18 by the pumps 48. The hoppers are filled with a mixture of milled cheese curd and salt.

When a high vacuum is obtained in the columns 18, the valves 51 are opened so that the difference between the low pressure in the columns 18 and the comparatively high atmospheric pressure acting on the curd in the hoppers causes the curd to flow up the pipes 25 and into the cyclone separators 17. The mass of curd in the hoppers and pipes provides sufficient restriction to entry of air through the pipes into the chambers 18 to enable vacuum to be maintained therein. The curd entering each cyclone separator is of course immediately subjected to the low pressure therein and some of the moisture in the curd is "flashed off" into vapour and withdrawn from the separator, together with air entering with the curd, through the pipe 47. Since the inlet pipe 46 of each separator opens tangentially into the cylindrical chamber 45 of the separator, the curd tends to travel around the wall of the chamber 45 before falling into the associated column 18, and the air and moisture vapour tend to flow into the centre of the chamber 45 where it is subjected to the updraught caused by evacuation of air through the pipe 47.

The curd falls from the separators 17 into the columns 18 and the trunk 10 and builds up into a mass of curd supported on the guillotine blade 23. The curd fills the trunk 10, the ducts 22 and partly fills the columns 18. The weight of curd in the columns compresses the curd at the lower ends of the columns and forces whey out of the curd, the whey passing through the perforations in the walls of the columns 18 and ducts 22 and into the drainage passageways 19, 21, 38, from which the whey is extracted through the pipes 40 and manifold 41.

The platform 29 is lowered by motor 28 to a position in which the platform is below the level of the track 27, and a container 26 fitted with a lining 52 and an end panel 54 as described above, is moved along the track 27 to a position directly below the trunk 10. The end panel 54 is then raised up inside the container by the motor 28 to a position in which the end panel is directly below the guillotine blade 23. The blade is then withdrawn by the motor 24 so that the pillar of curd within the trunk 10 slides down on to the end panel 54. The end panel, together with the pillar of curd, is then lowered slowly by the motor 28 down inside the lined container by a distance approximately equal to the depth of the container. During this movement of the curd in the trunk 10, the curd in the columns 18 flows through the ducts 22 into the top of the trunk 10 and fuses with the curd therein. The aggregate of the internal cross sectional areas of the columns 18 is approximately equal to the internal cross sectional area of the trunk, so that the curd moves at substantially the same speed during its passage from the columns 18 through the ducts 22 and into the trunk 10 thereby avoiding discontinuity in the flow of curd which might result in rupture of the pillar of curd formed in the trunk. The guillotine blade 23 is then forced by its motor 24 into the closed position, thereby cutting off a block of cheese from the lower end of the pillar. The end panel 54 together with the block of cheese is then lowered onto the track 27, and the container together with the end panel and block of cheese moved by any suitable conveyor means along the track to a packaging station.

At the packaging station, the strap 53 holding the upper end of the plastics liner in position is released and sealing means such as heat sealing jaws employed to seal the end of the liner. Subsequently, a lid is fixed on the container and the container then inverted by apparatus supplied for this purpose adjacent to the track 27. At this position, the strap holding the originally lower (now upper) end of the liner is released, and the liner evacuated by a deep vacuum pump system so that the liner itself provides a compressive force against the block of cheese within the container. The liner is then sealed to retain this vacuum compressed condition. It will be appreciated that the liner should be a substantially non-extensive plastics material at the compressive forces applied by the evacuating procedure.

Finally, in this condition, the packaged cheese block has a height somewhat less than that of the packaging container and a rigid platform is inserted on top of the cheese block prior to an outer lid being positioned to close the container. A plurality of compression springs can then be located between the outer lid and the rigid platform to maintain pressure against the cheese block during cooling thereof. The respective lids of the container are secured to the container body, usually by straps, and in this condition the container is ready for subsequent transport and for maturing in storage.

In the operation of the apparatus described above, the pressure in each of the columns 16 may be raised to or close to atmospheric pressure prior to lowering of the pillar of curd, so as to effect a compaction of the curd in the column. For this purpose, the apparatus is preferably provided with a large vacuum reservoir which is maintained by the air pump 48 at a low pressure, and valve means operable to connect each cylinder 16 alternately to atmosphere and to the vacuum reservoir, as shown for example in U.S. Pat. No. 4,061,794.

We claim:

1. Apparatus for forming large blocks of cheese from prepared cheese curd for packaging and maturing, comprising an upright hollow trunk of rectangular cross section, said trunk having internal transverse dimensions substantially equal to that of the desired blocks of cheese, a tubular frusto-conical casing of rectangular cross section mounted in an inverted position on said trunk, a partition of cruciform shape mounted inside the frusto-conical casing, four upright tubular casings of rectangular cross-section mounted on the frusto-conical casing, a perforated lining on the inside walls of each of the upright casings, said linings forming four hollow columns and said partition sub-dividing the interior of the frusto-conical casing into four ducts connecting the interiors of the columns with the interior of said trunk, means for feeding prepared cheese curd into said columns so as to fill the trunk with a mass of curd and at least partly fill the columns with curd supported on the mass of curd in the trunk, vacuum means for maintaining the interiors of the columns at a sub-atmospheric pressure during feeding of the curd therein whereby some of the moisture in the curd is "flashed off" together with air entering with the curd, said linings co-operating with their casings to form drainage passages therebetween for whey expressed from the curd in the lower end portions of the columns due to the weight of curd superimposed thereon, means for lowering the mass of curd in the trunk so that the curd in the lower end portions of the columns flows into the trunk and fuses with the curd therein to form a pillar of curd, and means for severing the lower end of said pillar of curd to form a block of cheese.

2. Apparatus as claimed in claim 1, wherein said frusto-conical casing is fitted with a perforated lining which co-operates with the casing to form a drainage passage therebetween, and said partition is formed from perforated plate shaped to form four sections each defining two walls of a different one of said ducts, the opposing walls of adjacent sections converging towards one another in the downward direction and being interconnected at their lower edges to form a drainage trough for whey draining through the perforations in said walls, and means for draining whey from said trough.

3. Apparatus as claimed in claim 2, wherein an end of said trough abuts against the perforated lining on the frusto-conical casing, whereby whey in the trough drains through the perforations in the lining and into the drainage passage between the lining and the frusto-conical casing.

4. Apparatus for forming large blocks of cheese from prepared cheese curd for packaging and maturing, comprising an upright hollow trunk having internal transverse dimensions substantially equal to that of the desired blocks of cheese, a tubular frusto-conical casing mounted in an inverted position on said trunk, a plurality of hollow columns mounted on said frusto-conical casing, a partition mounted inside said frusto-conical casing and sub-dividing the interior of the frusto-conical casing into a plurality of ducts each connecting the interior of a separate one of said columns with the interior of the trunk, means for feeding prepared cheese curd into said columns so as to fill the trunk with a mass of curd to form a pillar of curd therein and at least partly fill the columns with curd supported on said pillar of curd in the trunk, vacuum means for maintaining the interiors of the columns at a sub-atmospheric pressure during feeding of the curd therein whereby some of the moisture in the curd is "flashed off" together with air entering with the curd, means for removing whey expressed from the curd in the lower end portions of the columns due to the weight of curd superimposed thereon, means for lowering the pillar of curd in the trunk so that the curd in the lower end portions of the columns flows into the trunk and fuses with the curd forming the top of said pillar of curd, and means for severing the lower end of said pillar of curd to form a block of cheese, wherein said partition has apertures for passage therethrough of whey expressed from the curd in said ducts due to the weight of curd superimposed thereon, and said partition forms a trough at the junction between adjacent ducts for collection of whey passing through said apertures in the partition, the apparatus including means for drainage of whey from said trough.

5. Apparatus as claimed in claim 4, wherein said partition comprises a perforated plate shaped to form converging walls which are substantially parallel to the converging walls of said inverted frusto-conical casing and co-operate therewith to form said ducts, the lower edges of the converging walls of said perforated plate being interconnected to form said trough or troughs.

6. Apparatus as claimed in claim 5, wherein the frusto-conical casing is fitted with a perforated lining which is spaced from the casing to form a drainage passage therebetween, and the side edges of the perforated plate abut against and extend along the linings on the converging walls of said frusto-conical casing whereby whey in said troughs can drain through the perforations in the lining on the frusto-conical casing and into said drainage passage between the lining and the frusto-conical casing.

7. Apparatus as claimed in claim 4, wherein the aggregate of the internal transverse cross sectional areas of the columns is substantially equal to the internal transverse cross sectional area of the trunk so that, in use, the rate of descent of the curd in the columns is substantially the same as that of the curd in the trunk.

* * * * *